(12) United States Patent
Chiang

(10) Patent No.: US 7,014,404 B2
(45) Date of Patent: Mar. 21, 2006

(54) NUT MEMBER WITH TIGHTNESS-INDICATING PROTRUSIONS AND LOOSENING-PREVENTING RECESSES

(76) Inventor: Chih-Chung Chiang, No. 31, Ta-She W. Rd., Tzu-Kuan Hsiang, Kaohsiung Hsien (TW)

( * ) Notice: Subject to any disclaimer, the term of this patent is extended or adjusted under 35 U.S.C. 154(b) by 0 days.

(21) Appl. No.: 10/956,042

(22) Filed: Oct. 4, 2004

(65) Prior Publication Data

US 2005/0111930 A1     May 26, 2005

Related U.S. Application Data

(63) Continuation-in-part of application No. 10/452,496, filed on Jun. 3, 2003, now abandoned.

(51) Int. Cl.
    *F16B 31/02*     (2006.01)
    *F16B 39/12*     (2006.01)

(52) U.S. Cl. .......................... 411/9; 411/184; 411/187; 411/239; 411/237; 411/223; 411/229; 411/227

(58) Field of Classification Search ............... 411/8–11, 411/184–189, 227–229, 223, 237, 239
See application file for complete search history.

(56) References Cited

U.S. PATENT DOCUMENTS

| | | | | |
|---|---|---|---|---|
| 1,901,744 A | * | 3/1933 | Glover ....................... 411/228 |
| 2,167,285 A | * | 7/1939 | Smith ......................... 403/270 |
| 2,570,863 A | * | 10/1951 | Rowe ............................. 411/9 |
| 2,612,647 A | * | 10/1952 | Howe .......................... 470/21 |
| 2,784,930 A | * | 3/1957 | Wernecke ................... 248/188 |
| 2,909,205 A | * | 10/1959 | Johnson ...................... 411/280 |
| 3,194,105 A | * | 7/1965 | Gill ............................. 411/10 |
| 3,285,120 A | * | 11/1966 | Kartiala ......................... 411/8 |
| 5,370,483 A | * | 12/1994 | Hood et al. .................. 411/10 |
| 5,433,567 A | * | 7/1995 | Ito .............................. 411/150 |
| 6,827,537 B1 | * | 12/2004 | Norman et al. ............. 411/171 |

FOREIGN PATENT DOCUMENTS

DE     EP 0833067     * 1/1998

* cited by examiner

*Primary Examiner*—Katherine Mitchell
(74) *Attorney, Agent, or Firm*—Hunton & Williams LLP

(57) ABSTRACT

A nut member has first and second end faces and corners, and is formed with a plurality of protrusions, each of which is disposed at a respective corner and each of which has a lateral inner face that extends from the second end face, and a plurality of recesses, each of which is indented inwardly from a respective corner and each of which is defined by a recess-defining wall. The recess-defining wall has a lateral outer face that extends from the first end face. Each protrusion is received in and meshes with a respective recess, and the lateral outer face is in face-to-face contact with the lateral inner face when two of the nut bodies are stacked and are tensioned on a screw bolt.

2 Claims, 3 Drawing Sheets

NUT MEMBER WITH TIGHTNESS-INDICATING PROTRUSIONS AND LOOSENING-PREVENTING RECESSES

CROSS-REFERENCE TO RELATED APPLICATION

This application is a continuation-in-part (CIP) of U.S. patent application Ser. No. 10/452,496, filed by the applicant on Jun. 3, 2003, and abandoned as of the filing date of this application. The entire disclosure of the parent application is incorporated herein by reference.

BACKGROUND OF THE INVENTION

1. Field of the Invention

The present invention relates to a nut member, more particularly to a nut member with tightness-indicating protrusions and loosening-preventing recesses.

2. Description of the Related Art

U.S. Pat. No. 3,194,105 discloses a conventional nut body that has a square base provided on its underside with a relieved octagonal recess, four grooves across four corners of the nut body which are provided with four triangular feet, and a gap on each side of the base between two adjacent ones of the triangular feet. The gaps on the sides of the base are utilized to indicate when the desired minimum tension has been achieved in a bolt applied with the nut body.

U.S. Pat. No. 2,570,863 discloses a conventional nut body that has a flat thrust face which is provided with parallel symmetrically disposed ridges. Parallel slots are formed in the nut body, and are spaced apart from and are aligned with the ridges. As the nut is tensioned on a bolt, the ridges are forced in an axial direction and are moved toward the nut axis to close the initially open sides of the slots.

The aforementioned conventional nut bodies are disadvantageous in that loosening of the conventional nut body on the bolt tends to occur due to repeated expansion and contraction of the nut body and the bolt.

SUMMARY OF THE INVENTION

Therefore, the object of this invention is to provide a nut member with tightness-indicating protrusions and loosening-preventing recesses, which is capable of overcoming the aforesaid disadvantage of the prior art.

According to the present invention, a nut member includes: a polygonal nut body defining an axis and an inner thread around the axis, and having a first end face around the axis, a second end face around the axis and opposite to the first end face in an axial direction relative to the nut body, and a plurality of side faces angularly disposed around and parallel to the axis and interconnecting the first and second end faces. Each adjacent pair of the side faces cooperatively define a corner therebetween. The nut body is formed with a plurality of tightness-indicating protrusions, each of which is disposed at a respective one of the corners, each of which projects axially and outwardly from the second end face of the nut body, and each of which has a lateral inner face that faces inwardly of the nut body, that crosses a respective one of the corners, and that extends from the second end face of the nut body in the axial direction away from the first end face of the nut body. The nut body is further formed with a plurality of loosening-preventing recesses, each of which is indented inwardly from a respective one of the corners, each of which is aligned with and is opposite to a respective one of the tightness-indicating protrusions in the axial direction, and each of which is defined by a recess-defining wall. The recess-defining wall has a lateral outer face that faces outwardly of the nut body, that crosses a respective one of the corners, that extends from the first end face of the nut body in the axial direction toward the second end face of the nut body, and that is substantially flush with the lateral inner face of the respective one of the tightness-indicating protrusions in such a manner that each of the tightness-indicating protrusions of a first one of the nut bodies is received in and meshes with the respective one of the loosening-preventing recesses of a second one of the nut bodies and that the lateral outer face is in face-to-face contact with the lateral inner face when the first and second ones of the nut bodies are stacked and are tensioned on a screw bolt, thereby providing a blocking effect to prevent rotation of one of the nut bodies relative to the other of the nut bodies on the screw bolt.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
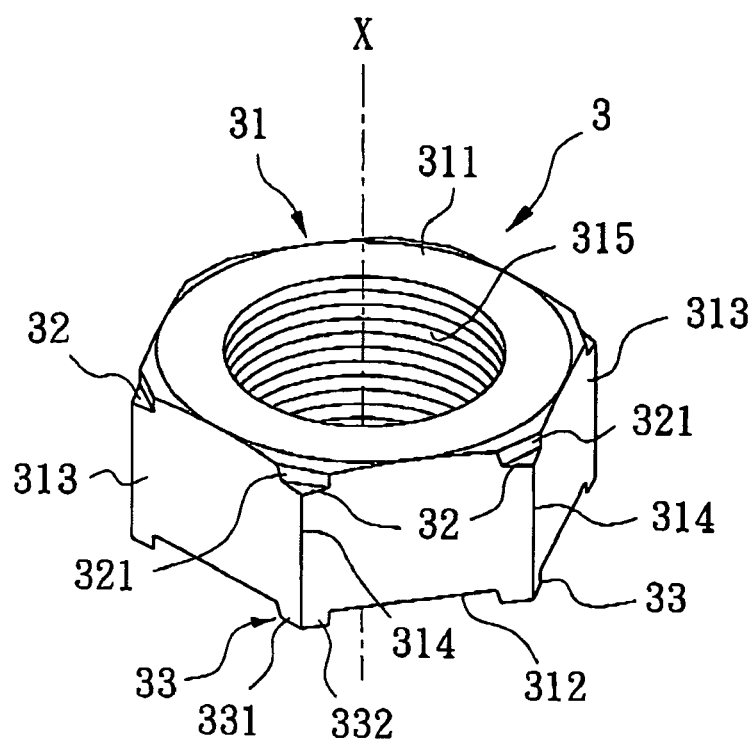
FIG. 1 is a top perspective view of the preferred embodiment of a nut member according to the present invention.
Figure 2:
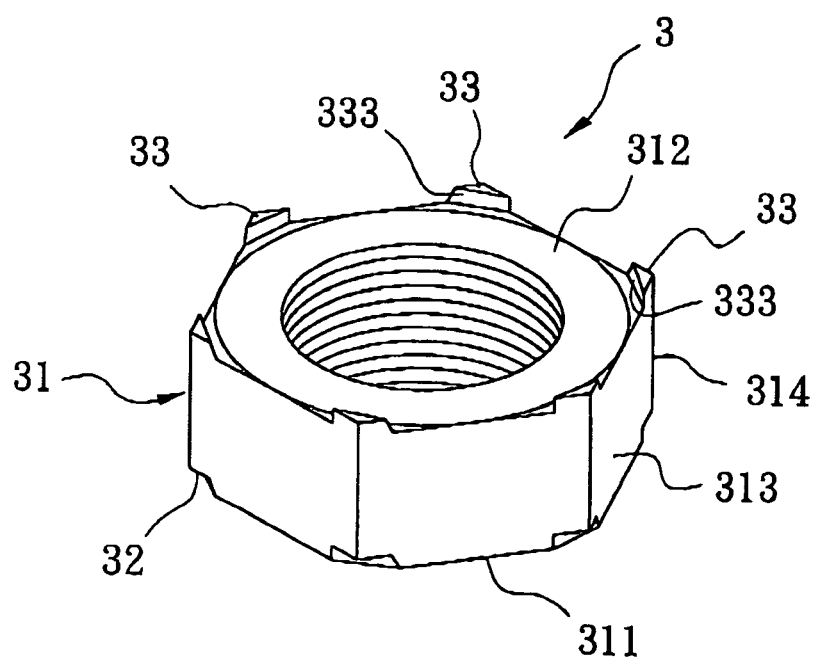
FIG. 2 is a bottom perspective view of the preferred embodiment of a nut member according to the present invention.
Figure 5:
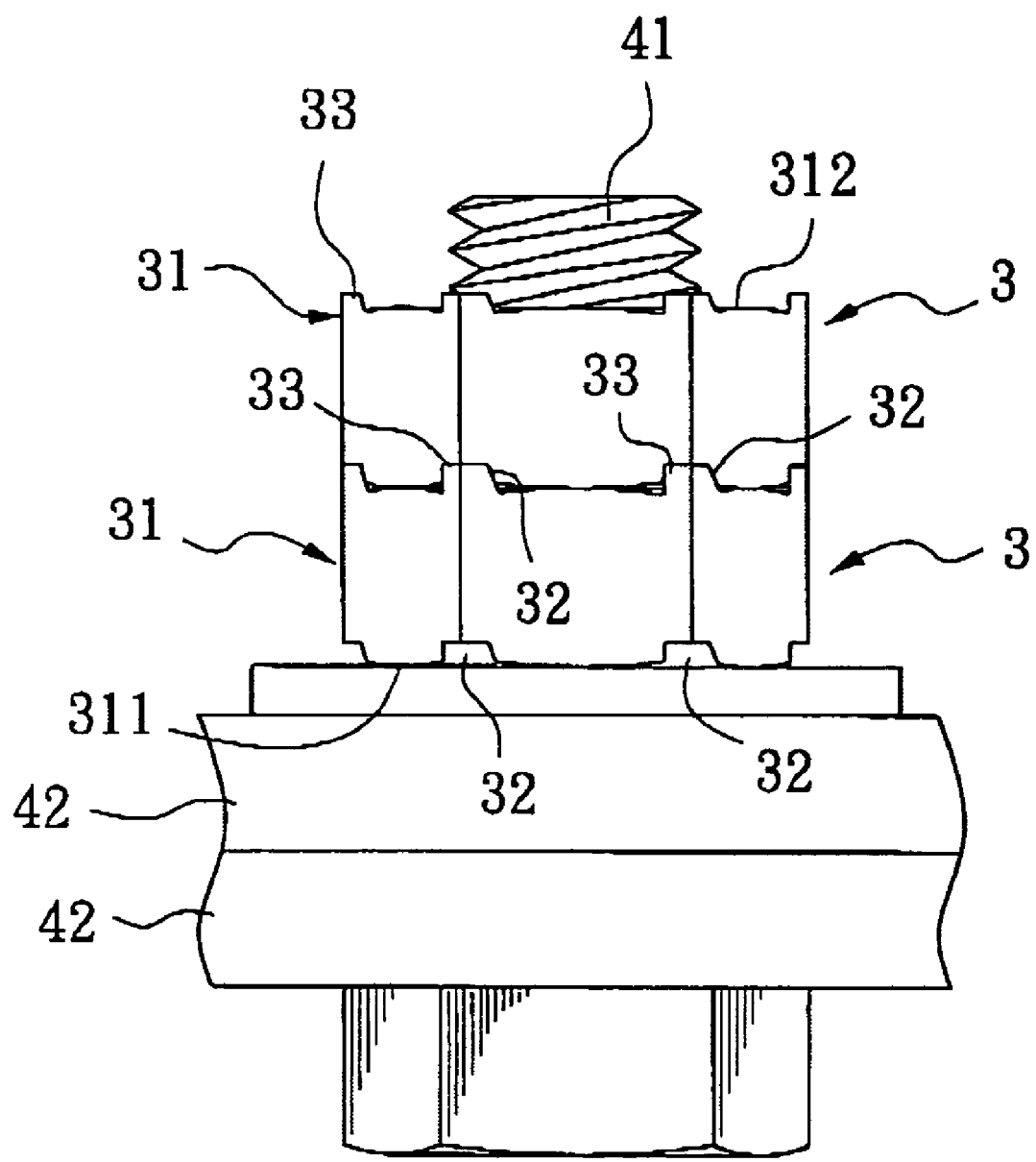
FIG. 5 illustrates a state after tightening of the two nut members of the preferred embodiment to fasten the workpieces together.

FIGS. 1, 2 and 5 illustrate the preferred embodiment of a nut member 3 for tightening two workpieces 42 on a screw bolt 41 according to the present invention.

The nut member 3 includes: a polygonal nut body 31 defining an axis (L) and an inner thread 315 around the axis (L), and having a first end face 311 around the axis (L), a second end face (312) around the axis (L) and opposite to the first end face 311 in an axial direction relative to the nut body 31, and a plurality of side faces 313 angularly disposed around and parallel to the axis (L) and interconnecting the first and second end faces 311, 312. Each adjacent pair of the side faces 313 cooperatively define a corner 314 therebetween. The nut body 31 is formed with a plurality of tightness-indicating protrusions 33, each of which is disposed at a respective one of the corners 314, each of which projects axially and outwardly from the second end face 312 of the nut body 31, and each of which has a lateral inner face 333 that faces inwardly of the nut body 31, that crosses a respective one of the corners 314, and that extends from the second end face 312 of the nut body 31 in the axial direction away from the first end face 311 of the nut body 31. The nut body 31 is further formed with a plurality of loosening-preventing recesses 32, each of which is indented inwardly from a respective one of the corners 314, each of which is aligned with and is opposite to a respective one of the tightness-indicating protrusions 33 in the axial direction, and each of which is defined by a recess-defining wall. The recess-defining wall has a lateral outer face 321 that faces outwardly of the nut body 31, that crosses a respective one of the corners 314, that extends from the first end face 311 of the nut body 31 in the axial direction toward the second end face 312 of the nut body 31, and that is substantially flush with the lateral inner face 333 of the respective one of the tightness-indicating protrusions 33 in such a manner that each of the tightness-indicating protrusions 33 of a first one of the nut bodies 31 is received in and meshes with the respective one of the loosening-preventing recesses 32 of a second one of the nut bodies 31 and that the lateral outer face 321 is in face-to-face contact with the lateral inner face 333 when the first and second ones of the nut bodies 31 are stacked and are tensioned on a screw bolt 41 (see FIG. 5), thereby providing a blocking effect to prevent rotation of one of the nut bodies 31 relative to the other of the nut bodies 31 on the screw bolt 41.

In this embodiment, each of the tightness-indicating protrusions 33 has first and second outer faces 331, 332 that are respectively flush with the adjacent pair of the side faces 313.

Figure 3:
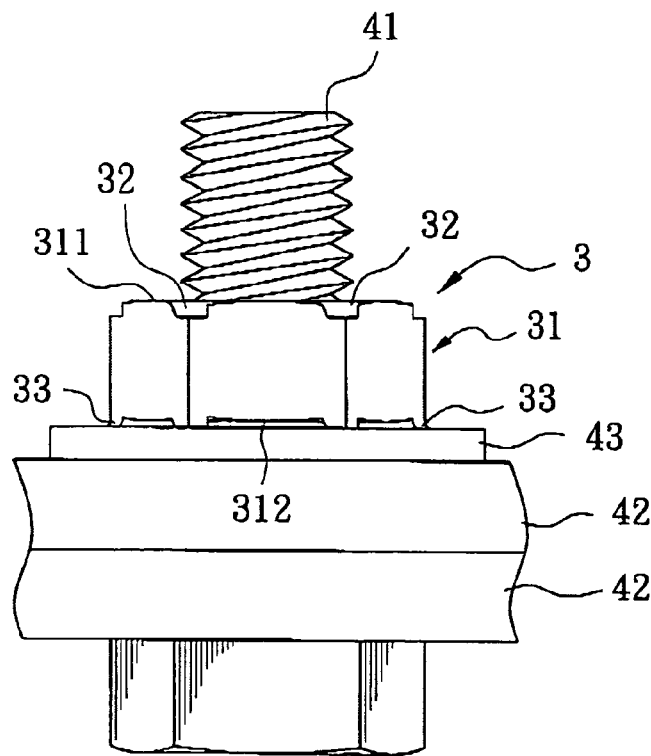
FIG. 3 illustrates how the preferred embodiment cooperates with a screw bolt to fasten two workpieces together in one way.

FIG. 3 illustrates how the two workpieces 42 are fastened together on the screw bolt 41 through the nut member 3 of the preferred embodiment. A washer 43 is disposed between the nut member 3 and an upper one of the workpieces 42. The tightness-indicating protrusions 33 of the nut body 31 of the nut member 3 abut against the washer 43, and are slightly deformed when the workpieces 42 have reached a desired fastened state.

Figure 4:
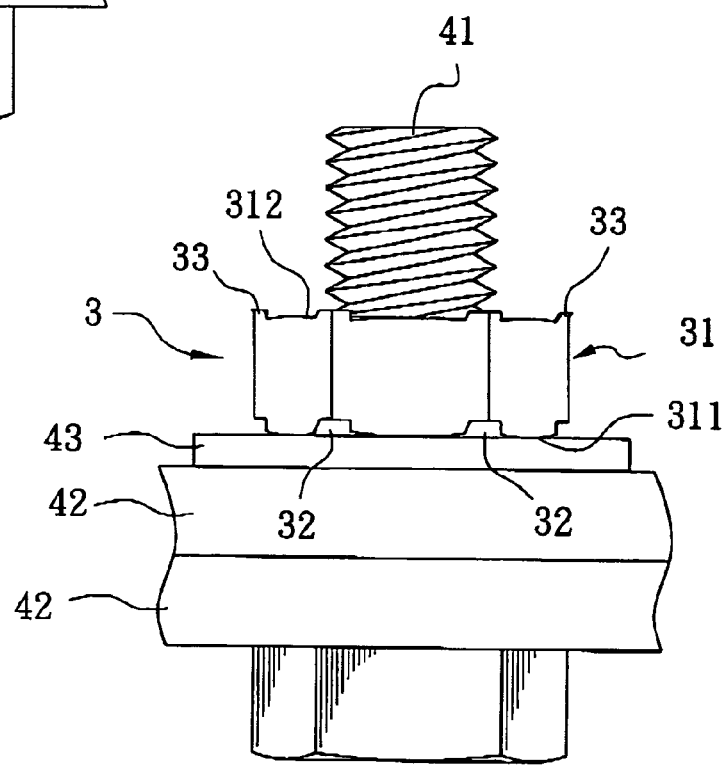
FIG. 4 illustrates how the preferred embodiment cooperates with the screw bolt to fasten the workpieces together in another way.

FIG. 4 illustrates how the workpieces 42 are fastened by the nut body 31 of the nut member 3 in another way as compared to that of FIG. 3. In FIG. 4, the nut body 31 of the nut member 3 is inverted, and is rotated by a tool (not shown), which has a configuration for meshing with the tightness-indicating protrusions 33 of the nut member 3, so as to permit the first end face 311 of the nut body 31 to abut against the washer 43. Tightening action of the nut member 3 relative to the screw bolt 41 is stopped upon observing minor deformation of the tightness-indicating protrusions 33.

The extent of deformation of the tightness-indicating protrusions 33 of the nut member 3 is related to the thickness thereof. The thickness of the tightness-indicating protrusions 33 of the nut body 31 of the nut member 3 can be varied so as to be adapted to fasten work pieces 42 of different dimensions, which require different tightening forces.

With this invention thus explained, it is apparent that numerous modifications and variations can be made without departing from the scope and spirit of this invention. It is therefore intended that the invention be limited only as indicated in the appended claims.

I claim:

1. A nut member comprising:
a polygonal nut body defining an axis and an inner thread around said axis, and having a first end face around said axis, a second end face around said axis and opposite to said first end face in an axial direction relative to said nut body, and a plurality of side faces angularly disposed around and parallel to said axis and interconnecting said first and second end faces, each adjacent pair of said side faces cooperatively defining a corner therebetween;
wherein said nut body is formed with a plurality of tightness-indicating protrusions, each of which is disposed at a respective one of said corners, each of which projects axially and outwardly from said second end face of said nut body, and each of which has a lateral inner face that faces inwardly of said nut body, that crosses a respective one of said corners, and that extends from said second end face of said nut body in said axial direction away from said first end face of said nut body; and
wherein said nut body is further formed with a plurality of loosening-preventing recesses, each of which is indented inwardly from a respective one of said corners, each of which is aligned with and is opposite to a respective one of said tightness-indicating protrusions in said axial direction, and each of which is defined by a recess-defining wall, said recess-defining wall having a lateral outer face that faces outwardly of said nut body, that crosses a respective one of said corners, that extends from said first end face in said axial direction toward said second end face of said nut body, and that is substantially flush with said lateral inner face of the respective one of said tightness-indicating protrusions in such a manner that each of said tightness-indicating protrusions of said nut body is capable of being received in and meshing with the said respective loosening-preventing recesses of nut body and that said lateral outer face is capable of face-to-face contact with a respective said lateral inner face when two said nut bodies are stacked and are tensioned on a screw bolt, thereby providing a blocking effect to prevent rotation of one of said nut bodies relative to the other of said nut bodies on the screw bolt.

2. A threaded fastener assembly comprising:
a screw bolt; and
first and second nut bodies capable of being stacked and tensioned on said screw bolt, each of said first and second nut bodies including
a polygonal nut body defining an axis and an inner thread around said axis, and having a first end face around said axis, a second end face around said axis and opposite to said first end face in an axial direction relative to said nut body, and a plurality of side faces angularly disposed around and parallel to said axis and interconnecting said first and second end faces, each adjacent pair of said side faces cooperatively defining a corner therebetween,
wherein said nut body is formed with a plurality of tightness-indicating protrusions, each of which is disposed at a respective one of said corners, each of which projects axially and outwardly from said second end face of said nut body, and each of which has a lateral inner face that faces inwardly of said nut body, that crosses a respective one of said corners, and that extends from said second end face of said nut body in said axial direction away from said first end face of said nut body; and
wherein said nut body is further formed with a plurality of loosening-preventing recesses, each of which is indented inwardly from a respective one of said corners, each of which is aligned with and is opposite to a respective one of said tightness-indicating protrusions in said axial direction, and each of which is defined by a recess-defining wall, said recess-defining wall having a lateral outer face that faces outwardly of said nut body, that crosses a respective one of said corners, that extends from said first end face of said nut body in said axial direction toward said second end face of said nut body, and that is substantially flush with said lateral inner face of the respective one of said tightness-indicating protrusions in such a manner that each of said tightness-indicating protrusions of said first nut body is received in and meshes with the respective one of said loosening-preventing recesses of said second nut body and that said lateral outer face is in face-to-face contact with said lateral inner face when said first and second nut bodies are stacked and are tensioned on said screw bolt, thereby providing a blocking effect to prevent rotation of one of said nut bodies relative to the other of said nut bodies on said screw bolt.

* * * * *